Figure 2:
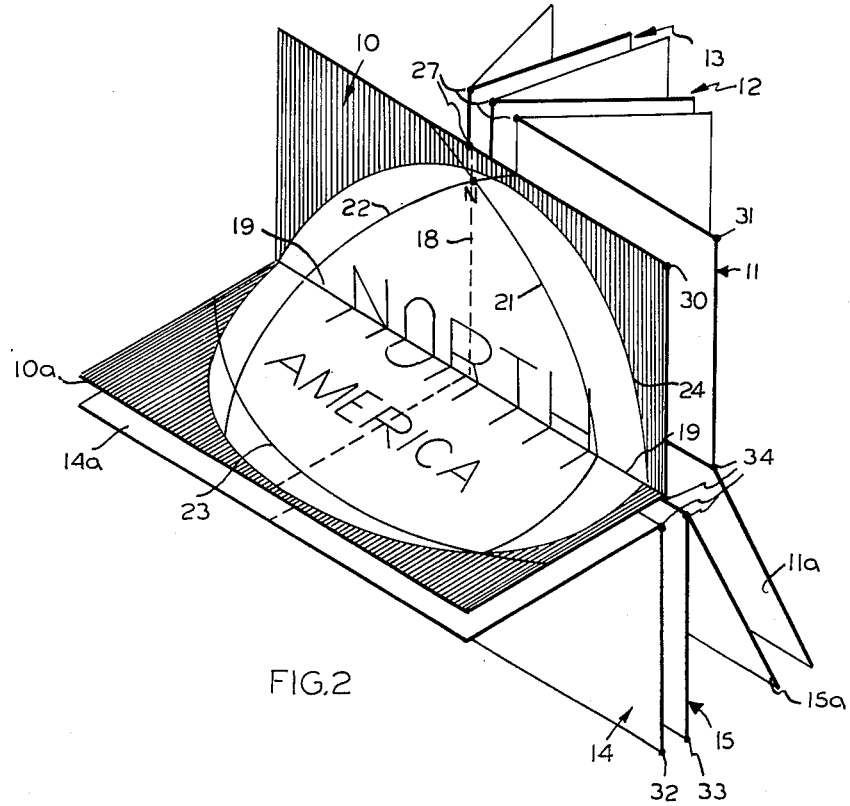

May 3, 1966  V. H. SCHRADER  3,248,806
MAP SYSTEM
Filed June 4, 1963  3 Sheets-Sheet 1

INVENTOR.
VICTOR H. SCHRADER
BY
Alfred B. Levine
ATTORNEY

May 3, 1966   V. H. SCHRADER   3,248,806
MAP SYSTEM
Filed June 4, 1963   3 Sheets-Sheet 2

INVENTOR
VICTOR H. SCHRADER

BY Alfred B. Levine
ATTORNEY

May 3, 1966 V. H. SCHRADER 3,248,806

MAP SYSTEM

Filed June 4, 1963 3 Sheets-Sheet 3

INVENTOR.
VICTOR H. SCHRADER
BY
*Alfred B. Levine*
ATTORNEY

United States Patent Office 3,248,806
Patented May 3, 1966

3,248,806
MAP SYSTEM
Victor H. Schrader, Wilmington, Del., assignor to Aero
Service Corporation, Philadelphia, Pa.
Filed June 4, 1963, Ser. No. 285,280
11 Claims. (Cl. 35—46)

This invention generally relates to improvements in maps and more particularly to a system of flat maps to replace map globes and being interconnected for use in the same manner as universally supported globes, e.g., being capable of rotation about either north-south or east-west axes, for enabling the user to logically pivot the maps and quickly refer to any position of the globe or easily trace a continuous route from one section of the globe to another.

Due to the considerable expense and large volume required by a spherical map globe of three or more feet in diameter, the prior art has long recognized the need for representing the earth or other geographic entity in the form of a large flat map, or a series of such large maps, which may be mounted against a wall or on a blackboard; and such large maps are very commonly used in homes, schools, and in various business and government institutions rather than the globes. However, regardless of the projection used, such conventional maps generally seek to present too much of the surface of the globe, and the map projection is generally overworked resulting in extreme distortion of the outlying areas. Additionally, in most of the conventional map projections, the map is presented within a square or rectangular format and projected in such fashion as to employ straight lines for latitude and longitude, obscuring the fact that the earth is substantially a sphere rather than a flat surface.

In the past, numerous efforts have been made to simulate map globes by the use of a series of interconnected flat maps, and one such map system is shown by the Eddy Patent 2,333,162. In this patent, a series of flat map sections depicting different portions of the earth are rotatable about a common north-south vertical axis so that the user may progress in a longitudinal direction about the earth by successively turning the maps about the single axis.

However, despite the fact that the Eddy map provides certain advantages over the use of conventional flat maps in conveying the concept of a spherically shaped earth, and in permitting logical reference from one portion of the earth to the other by a series of maps, it does not provide the advantage of a universally mounted globe that may be rotated about either or both of the north-south axis and east-west axis. Furthermore, in common with the disadvantages of conventional flat maps, the north and south polar regions on the Eddy map are necessarily distorted in favor of providing a desired scale of distance along the northern and southern hemisphere and equator, since the complete north-south region extending from the north pole to the south pole is presented on each map.

According to the present invention, there is provided a system of flat interconnected maps for representing the globe in which many of the disadvantages of these prior art maps are eliminated. Among other advantages, each of the maps of the series presents only a portion of the earth's surface in spherical projection and in such manner as to minimize distortions in representing the geographical areas. Additionally, the series of maps are pivotally interconnected with one another in a logical sequence and in such manner as to permit rotation of the flat maps about either north-south or east-west axis in the same manner as in the use of a universally mounted globe. Thus, the user may trace a continuous path about the earth in the northern or southern hemisphere by successively pivoting the maps about one axis, or alternatively travel between the northern hemisphere and the southern hemisphere by pivoting the maps about a second axis.

This novel interconnection of the maps also permits the series to be pivoted into a closed position in such manner as to occupy a surface area that is less than one-half the surface area of each map. This enables the system of maps to be easily and unobtrusively stored in a classroom or elsewhere, and to be easily moved from one place to another for demonstration or instruction purposes.

In a preferred embodiment of the invention, the map system is made portable and is provided with a lightweight and compact storage and display case that is adapted to be self supporting on a ledge or table, or alternately attachable to a wall. In its closed position, the case completely encloses and stores the maps therein, and in its open position, the system of maps are exposed for use without the need for their removal from the case. The case also incorporates in its interior a novel system of hinges for supporting each of the maps and enabling the maps to be pivoted about either north-south or east-west axis as described above. Since in the preferred embodiment of the invention, the maps are intended to replace a large map globe of from three to four feet or more in diameter, the novel construction of the case and its pivotable supporting means for the maps, permits the maps to be constructed of thin plastic sheets or other relatively lightweight and inexpensive material by providing the means for supporting and displaying the maps in the rotatable manner described.

It is accordingly a principal object of the invention to provide a series of interconnected maps representing a globe, that are selectively pivotable about two transverse axes and provide continuity of the geographical data from north-to-south or east-to-west about the globe.

A further object is to provide such a series of maps for accurately representing adjoining areas of a global map with minimized distortion, and being usable in the same manner as a universally mounted globe.

Still another object is to provide such a system of maps in which each flat map contains a spherical projection of a given geographical portion of the globe that is offset from a pivotal axis of the map in such manner as to minimize distortion.

A still further object is to provide such a map system incorporating a novel folding case for supporting and displaying the interconnected maps and being small, lightweight and portable.

Another object is to provide such a map system and case for a series of large size pivotally interconnected maps corresponding to a globe of from three to four feet or more in diameter, wherein the large maps are pivotally compactible into a relatively small size, and hence easily portable.

A still further object is to provide a compact and lightweight case for detachably supporting such a system of large scale maps and incorporating pivotal support means for each of the interconnected maps so that the large maps may be relatively inexpensive and of light weight materials.

Figure 1:
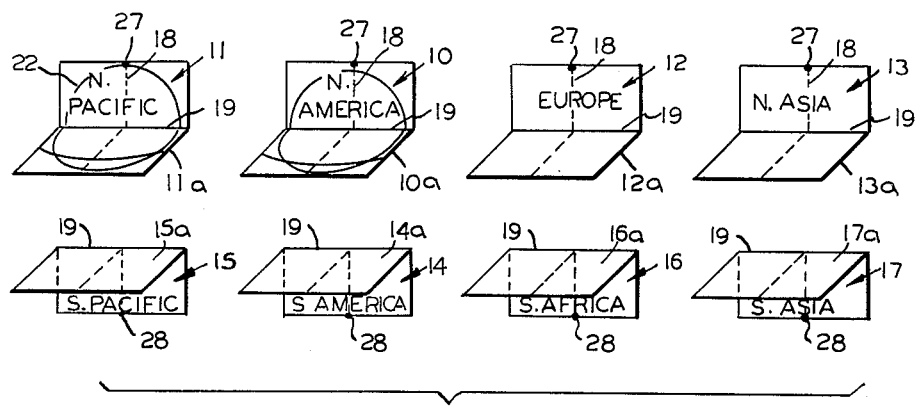
Figure 6:
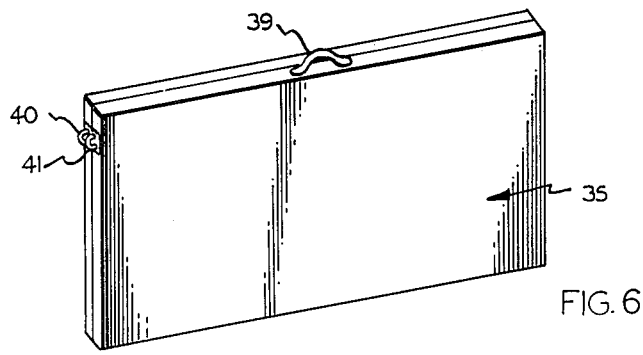
Figure 3:
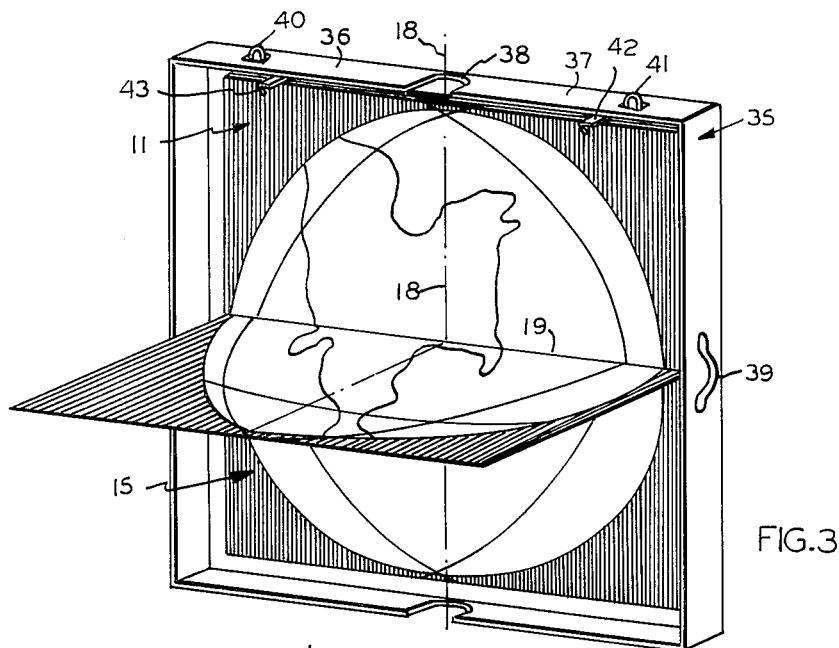
Figures 4, 5:
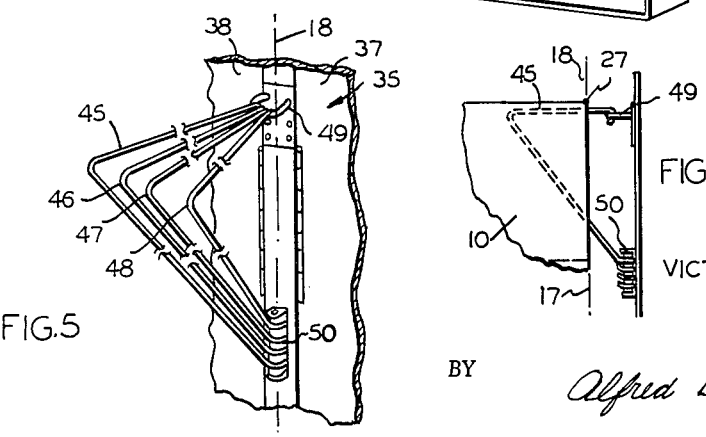
Figure 7:
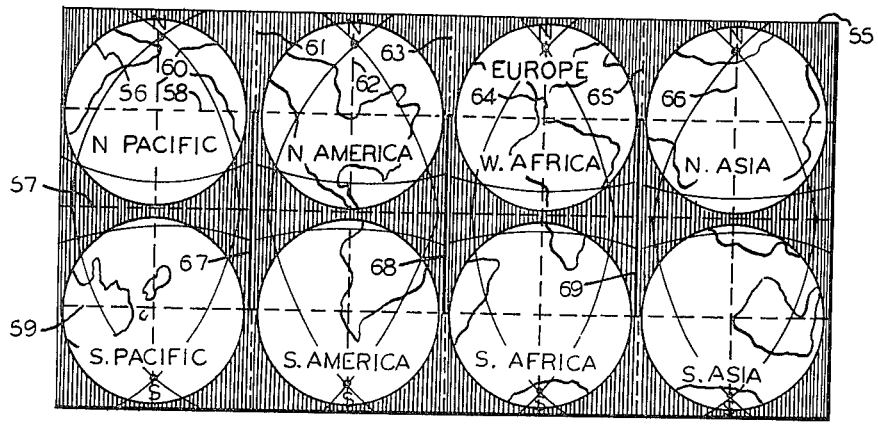
Figure 8:
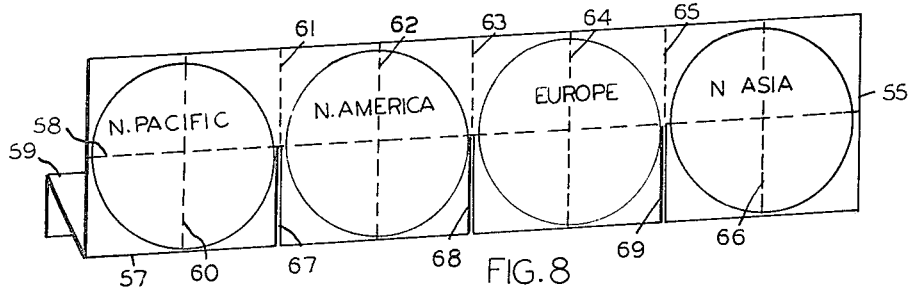
Figure 9:
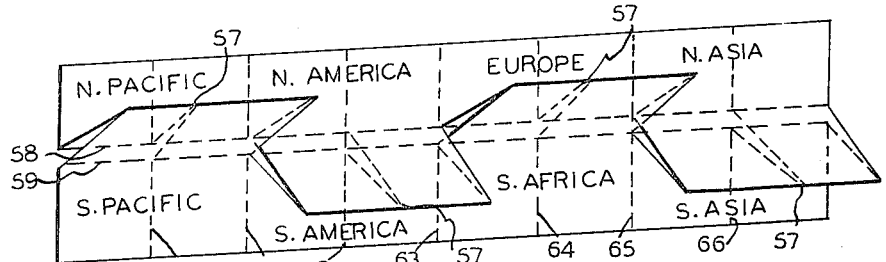
Figures 10, 11:
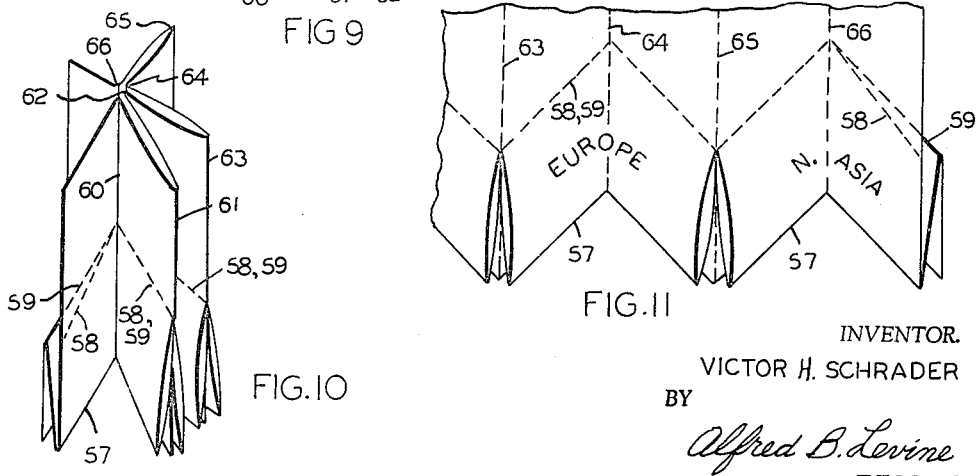

Other objects and many additional advantages will be more readily understood by those skilled in the art after a detailed consideration of the following specification taken with the accompanying drawings, wherein:

FIG. 1 is an exploded view in perspective of a series of separate maps with each containing a presentation of a different geographical area of a globe arranged in logical sequence, FIG. 2 is a perspective view, partially in exploded form, and illustrating one manner of interconnecting the maps of FIG. 1 for pivotal displacement about both the north-south and east-west axis, FIG. 3 is a perspective view, illustrating the interconnected maps of FIG. 2 being supported within a preferred carrying and display case, FIG. 4 is a side elevational view of a preferred pivotal hinge means incorporated within the map case for supporting the maps, FIG. 5 is a perspective view illustrating the arrangement of a series of the hinges of FIG. 4 and the manner of mounting the hinges within the case, FIG. 6 is a perspective view of the map case in its closed position, FIG. 7 is a plan view of a single large blank having two series of geographical flat maps representing the entire globe thereon, with the blank showing fold lines and scored lines in a manner permitting folding of the blank to provide the desired pivotal interconnection of the maps, FIGS. 8 to 10, inclusive, are a series of perspective views illustrating the manner of successively folding the blank of FIG. 7 to provide the desired two-way pivotal interconnection of the maps, and FIG. 11 is a perspective view illustrating the lower portion of the folded blank of FIG. 10 on an enlarged scale.

Referring to the drawing for a detailed consideration of preferred embodiments of the invention, there is shown in FIG. 1 a series of eight separate flat maps, each depicting a different portion of the globe in spherical projection, and in FIG. 2, one manner of pivotally interconnecting these eight maps in such manner that the maps may be pivoted about both the north-south axis 18 and the east-west axis 19 to trace a continuous path about or between the northern or southern hemisphere of the globe in the same manner as in the use of a spherical globe.

As best shown in FIGS. 2 and 7, in forming this system of maps, the globe, represented in this case by the earth, is divided into eight equal segments, each of which is projected as a different map within an equilateral spherical triangle, and as shown in FIG. 2, each of the spherical triangles are defined by two intersecting lines of longitude 21 and 22 and by the equator line 23. The equilateral triangles on each map are centrally disposed on that sheet such that equal mapped distances are provided to equal scale in both the north-south and east-west directions, providing a minimum distortion of the mapped area.

On the four upper maps 10 to 13, inclusive, the four quadrants of the northern hemisphere are successively provided in this manner of projection, and on the four lower maps 14 to 17, inclusive, the four quadrants of the southern hemisphere are provided, with the map of each quadrant of the southern hemisphere being disposed immediately below the logically associated one of the maps of the northern hemisphere.

It will be appreciated that since the spherical triangle of each map is comprised of the two lines of latitude at the quadrants and by the equator, the geographical area presented on each map and being located outside of each spherical triangle overlaps onto the adjacent maps to provide a continuous representation of the globe. A further significant feature of this system of maps is that each map is presented and circumscribed within a circular perimeter 24 that encompasses the polar region and the equator, thereby to visually preserve the concept of the spherical globe. The diameter of this circle 24 is also the same as the diameter of the globe from which each flat map is projected, whereby if the projection is on a 1 to 1 scale from a four foot of four feet in diameter, each flat map is also presented within a circle 24 of four feet in diameter. The areas outside of each circular perimeter 24 are shaded, colored or otherwise visually distinguished from the mapped area.

When viewing each flat map from a reasonable distance therefore, the geographical area that may be observed is about the same as that which can be observed on a globe of the same diameter, due to the spherical curvature of the globe. Thus, while an observer can determine that the flat map being viewed is not in fact a spherical globe, a distinct illusion of viewing a spherical globe is received due to the spherical triangle presentation, and the circumscribing circle 24 about each map.

For interconnecting the maps together in such manner that they may be successively pivoted about either the east-west or north-south axis, each of the maps is horizontally bisected by a horizontal fold line 19 and vertically bisected by a vertical fold line 18. The under side of the lower horizontal portion of each of the upper series of maps is then fastened to the under side of each of the upper horizontal portions of the corresponding lower map, by means of gluing or otherwise suitably fastening these portions of the maps together, thereby to provide initially a series of four combined maps as best shown in FIG. 2. Thus, viewing FIG. 2, it will be noted that the map 10 covering the quadrant of the globe including "North America" is fastened to the map 14 covering the quadrant of the globe including "South America" with the horizontal fold lines 19 on each map being in alignment. Consequently, by pivoting the interconnected portions of these two maps about the common horizontal axis 19, the viewer can observe the map of either North America 10 or South America 14 depending upon the direction of pivoting the flap portion of the two combined maps about this axis 19. Similarly, with respect to any of the other four combined maps, each may be pivoted about its horizontal axis 19 to display the corresponding quadrant of the northern hemisphere or the corresponding quadrant of the southern hemisphere by pivoting the flap or the connected map portions of the two maps about the horizontal axis 19.

Following this interconnection of each of the related northern hemisphere and southern hemisphere maps, the four combined maps are then suitably interconnected together, as shown in FIG. 2, to pivot about a common vertical axis 18, thereby to form a combined system of maps in which each pair of upper and lower maps representing the two quadrants in the northern and southern hemisphere may be pivoted about the vertical axis 18 with respect to each of the other pairs of maps, and each pair of maps may be individually pivoted about the horizontal axis 19 to expose either the northern or southern hemisphere of that section of the globe. By this arrangement, there is provided a combined system of maps in which a continuous route may be traced from map-to-map in the eastward or westward direction by pivoting the large sheets about the vertical axis 18, and a continuous path may be traced from the northern to or from the southern hemisphere at any section of the globe by pivoting the flap of that section of the map system about the horizontal axis 19, thereby providing essentially the same mode of operation as is provided by a universally mounted globe that is capable of rotation about either or both the north-south and east-west axis.

Specifically considering the manner of interconnecting the maps of FIG. 2 to provide the desired pivotal relationship, the underside portion 10a of map 10 is suitably fastened to the underside portion 14a of map 14; the underside portion 11a of map 11 is fastened to the underside portion 15a of map 15; and in a similar manner, the appropriate underside portion of map 12 is fastened to that of map 16, and of map 13 to map 17. By this interconnection each of the combined maps, such as maps 10 and 14, have a common portion or flap which may be pivoted about a horizontal axis 19; and when this flap is pivoted downwardly it exposes the northern quadrant of the globe set forth in the upper map, and when pivoted upwardly presents the geographically adjacent southern quadrant of the globe shown on the lower map. Consequently, whenever the user wishes to trace a continuous route from the northern hemisphere to the southern hemisphere, it is merely necessary to pivot the flap of the appropriate pair of maps about the horizontal axis 19.

As noted above, all of these pairs of maps are also commonly interconnected about the vertical axis 18 to be successively pivoted about this axis, and one manner of achieving this interconnection is to join all of the pairs of maps together at the edge positions 27 and 28 at opposite ends of the vertical axis 18, joining each adjoining pair of longitudinally related maps at the opposite edges 30–31 and 32–33, and joining each pair of longitudinally adjacent maps at the positions 35 at the ends of the horizontal axis 19, all as is shown in FIG. 2. With this manner of interconnection, each pair of maps can be pivoted about either the vertical axis 18 or the horizontal axis 19, as desired.

FIGS. 3 to 6, inclusive, illustrate details of a combined housing and carrying case 35 for supporting and displaying this system of pivotally interconnected maps. As shown, the case 35 is comprised of a pair of pivotally interconnected sections 36 and 37, each having a length and width dimension that is slightly larger than the area presented by one-half of the map, such that when the map system is supported within the open case with its vertical axis 18 being aligned with the case pivotal axis (not shown), the case serves to display the maps, as illustrated in FIG. 3.

In the preferred construction, the maps are disposed on sheets of thin flexible material, such as suitable plastic, oilcloth, strengthened paper board or the like, and provide a thin package when the system of maps are pivoted or folded together. The case provides suitable support for the flexible maps of the map system, and it is intended that the maps be displayed and used without their removal from the case, which therefore, not only supports the pages of the map in the upright position shown but permits the map sections to be easily pivoted about both the north-south and east-west axes, as will be described.

The two sections of the case, are preferably formed of thin sheet material, such as aluminum, to provide lightweight and easy portability, and are formed with a flat back portion and raised sides, as shown, to provide a narrow chamber therein for accommodating the map system. In a preferred system of maps for representing a large globe of about four feet in diameter, each of these sections of the case is slightly over four feet long by two feet wide and the sides are less than two to three inches in depth.

On each of the upper sides of both sections, there is provided a raised eyelet member 40 and 41, near the opposite ends thereof as shown, so that the case may be supported in its opened position on a wall or blackboard by the use of suitable hooks fastened to the wall and engaging the eyelet members 40 and 41. Alternatively, the extended sides of the case permit the case to easily rest on the eraser shelf of a blackboard in a classroom, or on a table or bench, whichever might be most convenient to the teacher or other user.

The case is provided with a latch (not shown) for maintaining the sections closed, and with a handle 39 centrally attached to one of the sides of the case so that the closed case may be easily carried from classroom to classroom. Since the case is formed of aluminum or other light-weight and strong material, and the maps are preferably provided on large sheets of plastic or other lightweight material, the complete map system and case is very compact and easily portable.

For supporting the system of maps within the case in the upright position shown in FIG. 3, there is provided a series of pivotally mounted wire hangers 45 to 48, respectively, as best shown in FIG. 5, with each hanger having one end thereof being pivotally attached to a ring 49 fastened on the inner back wall of the case near its upper edge, and having the opposite end being pivotally mounted within a barrel shaped multiple hinge member 50 located centrally at the rear wall of the case. Both the ring 49 and hinge member 50 are disposed along an axis parallel to the pivot axis 18 of the map system so that each of the wire hangers may individually pivot about this axis to permit turning of the sections of the map about its vertical axis 18.

As best shown in FIG. 4, each of these wire hangers, such as the hanger 45, is adapted to be fitted into the space betwen two adjoining maps, which as noted above are fastened together along the upper edge, or at position 27 (FIG. 2), and therefore, each lonitudinally adjacent pair of maps is supported on a separate wire hanger that is pivotable about the vertical axis of the map system. In a preferred embodiment, the maps are not fastened to the wire hangers but merely supported by the hangers when the map system is vertically upright, so that the complete map system may be detached from the case for repair of the maps, or for the substitution of a different system for maps within the case.

For maintaining the folded system of maps open for display at any one of the maps selected, there is provided a pair of brackets 42 and 43, on the upper side of each section of the case. Each of these brackets 42 and 43 is pivotally mounted (not shown) on the inside of the upper wall of that section of the case, and is rotatable to an outward projecting position as shown in FIG. 3 to overlie the map sections when the case is open. Each bracket is provided with a downwardly depending portion at its outer end to serve as a stop for the map sections so that by means of these brackets, the map sections are held in place and prevented from pivoting about the vertical axis 18. When the map sections are rotated about the horizontal axis 19 to expose the map of the southern hemisphere, the pivoted flap member is also held in place in the upward position by means of the stops 42 and 43 which engage the edge of the flaps. Consequently, the pair of stops 42 and 43 maintain any one of the eight selected maps in the open position and prevent pivoting of these maps about either the vertical or horizontal axis, as noted above, the stops 42 and 43 are pivotally supported by the case, and when it is desired to close the case, the stops may be pivoted to occupy a position inside of the wall area so that two sections of the case may be closed to the position shown in FIG. 6.

The stops 42 and 43 are preferably made of a flexible material, such as a suitable plastic or a thin metal sheet that may be elastically displaced manually by the user when it is desired to pivot the various sections of the map, yet are provided of a sufficiently resilient material and thickness to maintain the three or four foot map sections in place at the page and flap selected.

FIGS. 7 to 11, inclusive, illustrate an alternative manner of forming the series of pivotally interconnected maps on a single large blank having the map regions printed, embossed or otherwise formed at adjoining positions of the blank.

To represent a globe of the earth in the same manner as discussed above, a large enough blank 55 is provided to supply eight equal areas thereon, each sufficiently large to accommodate a circle having a diameter equal to the diameter of the globe or sphere from which the map projection is to be made. Thus, presupposing that it is desired to represent a globe of four feet in diameter, the length of the blank would be somewhat larger than sixteen feet long to accommodate four of such circles along its length, and the width of the blank would be somewhat larger than eight feet to accommodate two of such circles.

Within each of the circumscribing circles, there is provided the same spherical triangle and map regions as discussed above in connection with FIGS. 1 and 2, with four of such maps covering, in related sequence, the geographically adjacent regions in the northern hemisphere and being provided as an upper series of maps across the blank, and with four of such maps covering in geographical sequence the related regions in the southern hemisphere and being disposed as a lower series of four maps across the blank 56. Each of the maps of the lower series, is in vertical alignment with the related geographical map of the upper series.

After the maps have been applied to the blank 55, the blank 55 is provided with three equally spaced horizontally disposed fold lines 57, 58, and 59, having the central fold line 57 horizontally dividing the upper and lower series of maps as shown. The upper and lower horizontal fold lines 58 and 59 are equally spaced from the central fold line 57 and horizontally bisect the maps in the upper series and in the lower series. In addition to the horizontal fold lines, there is provided a series of seven equally spaced vertical fold lines 60 to 66, inclusive, that are arranged transversely to the horizontal fold lines, and disposed in such manner that alternate ones of the vertical fold lines 61, 63, and 65 divide adjacent maps; and the remaining vertical fold lines 60, 62, 64 and 66 vertically bisect each of these maps. Along each of these alternate transverse fold lines 61, 63 and 65, the blank 55 is slitted for a distance extending from the upper horizontal fold line 58 to the lower horizontal fold line 59, all as is shown in FIG. 7.

The blank 55 is then horizontally folded in accordion fashion or fan folded fashion along the horizontal fold lines 57, 58, and 59, as shown in FIG. 8. Due to the presence of the slits 67, 68, and 69, separating the horizontally adjacent maps, the central accordion folds of each associated pair of the upper and lower maps are separately pivotable from the others as is shown in FIG. 9.

In the following step, as illustrated in FIG. 9, the horizontal fold lines 58 and 59 for each associated north-south pair of maps, are brought together and are fastened by glueing or otherwise, so that the width of the blank is reduced by one-half, and each of the maps longitudinally across the blank is comprised of an upper half portion of a northern hemisphere map, a lower half portion of a southern hemisphere map, and a pivotable flap being disposed between the two half map sections and being horizontally pivotable about the combined horizontal folds 58 and 59. These flaps have on their opposite sides, the remaining halves of the maps of the north and south hemisphere, whereby when the flaps are pivoted upwardly, the complete southern hemisphere map is exposed, and when the flaps are pivoted downwardly, the complete northern hemisphere map is exposed.

In the remaining step of completing this system of maps, the blank 55 is then accordion folded about its transverse axes 60 to 66, inclusive, as is best shown in FIGS. 10 and 11, resulting in a transversely folded arrangement resembling a book, whereby each adjoining pair of pages of the book is separated by an inwardly fold line such as lines 60, 62, 64, and 66, and each such pair of pages provides a different pair of the maps of a northern and southern hemisphere. These pages are then interconnected together at the transverse fold lines 60, 62, 64, and 66, to provide a common vertical pivot axis for the maps, thereby permitting each of these different pairs of maps to be selectively exposed by pivoting the pages about this common vertical axis.

The system of maps prepared from a single blank in the above described manner functions in the same manner as does the system of interconnected separate maps described above in connection with FIGS. 1 and 2 and therefore may be incorporated within the case 35 and used in the same manner as described above. For tracing a path eastwardly or westwardly about the globe, each section of the map is successively pivoted about the vertical or transverse axes to expose each succeeding quadrant of the northern or southern hemisphere, and for reversely tracing a path from the northern hemisphere to the southern hemisphere, the flaps associated with each pair of maps may be pivoted about the horizontal axes 58, 59.

Thus the system of maps for representing the globe may be operated in the same manner as a universally rotatable globe, being pivotable about either the north-south or east-west axis in a logical fashion to rapidly locate any position on the globe or to trace a continuous route about the globe.

Although but preferred embodiments of the invention have been illustrated and described, it is believed evident that many changes may be made by those skilled in the art without departing from the spirit and scope of this invention. For example, the map sections of this system may be made of separate panels of thin, rigid material such as plywood, sheet metal or other stiff material, and may be pivotally interconnected in the described manner by means of hinges interconnecting these members. In this case, the case or housing may be completely eliminated and the map system may be made itself self-supporting either on a wall or blackboard or on a suitable platform. Alternatively, such a system of maps may be permanently fastened within a case similar to that described instead of detachably connected thereto as described in the preferred embodiment. The global data being presented on the series of maps need not necessarily be that of the earth, but instead may be of any geographical spherical surface such as the moon, the planets, or the like. Since these and many other changes may be made in the construction and arrangement of the map system without departing from the spirit and scope of this invention, this invention is to be considered as being limited only by the following claims appended hereto.

What is claimed is:

1. A system of interconnected maps together covering the earth and being pivotally interconnected transversely and longitudinally to provide continuity in selectively tracing east-west and north-south routes, each map being presented in spherical projection and centrally containing a quadrant of the earth defined by an equilateral spherical triangle having two intersecting lines of longitude and the equator, and with four upper maps presenting the entire northern hemisphere and four lower maps presenting the entire southern hemisphere, the total area represented by each map being slightly more than one-fourth of the area of the earth's surface and being presented within a circular perimeter having a diameter that is the same as the diameter of a globe corresponding to the spherical projection on the map, the four maps representing the upper hemisphere being pivotally connected together along a transverse axis bisecting each of said maps, and with the maps being associated in related geographical relationship to successively expose each of the upper quadrants as the maps are consecutively pivoted about said axis, the four lower maps representing the lower hemisphere being pivotally connected together along the same transverse axis bisecting each of said lower maps, and each of the four lower maps being pivotally interconnected with an associated one of the upper maps about a longitudinal axis.

2. In the system of maps of claim 1, each of the eight maps being disposed on a separate sheet with the upper series of maps each having a portion attached to the next succeeding upper map and a portion attached to an associated one of the lower series of maps.

3. In the system of maps of claim 1, all of the maps being disposed on a single blank, with the upper series of maps disposed side-by-side along the upper portion of the blank and the lower series disposed side-by-side along the upper portion of the blank and the lower series disposed side-by-side along the lower portion, said blank being fan folded transversely and longitudinally and being scored along portions of the transverse folds to permit individual pivoting of the sections of the blank along the longitudinal fold lines.

4. A global map system comprising a series of eight interconnected flat leaves each containing a spherical projection map of about one-fourth of a world globe disposed with a circular outline and containing two intersecting lines of longitude and the equator, an initial four of said maps presenting the complete upper hemisphere being pivotally interconnected about a transverse axis, the remaining four of said maps presenting the complete lower hemisphere being pivotally interconnected about said transverse axis, and each of said remaining four maps being pivotally interconnected about a longitudinal axis with a different one of each of said initial four of said maps, whereby the leaves may be selectively pivoted about said transverse axis to consecutively display each adjoining map in the northern hemisphere and to consecutively display each adjoining map in the southern hemisphere; and may be pivoted about said longitudinal axis to consecutively display any one of the maps in the northern hemisphere and its adjoining map in the southern hemisphere.

5. A folding representation of a globe comprising: a large blank occupying an area greater than the surface area of the globe to be represented, said blank being divided into eight equal areas and on each being disposed a map of a different quadrant of the globe in the form of a spherical projection defined by two intersecting lines of longitude and the equator, four of said maps being disposed side-by-side as an upper series across the upper half of the blank and successively presenting adjacent geographical areas of the northern hemisphere, and four of said maps being disposed across the lower half of the blank with the lower maps successively presenting adjacent geographical areas of the southern hemisphere, and with each map of the northern hemisphere being in alignment with a geographically adjacent map of the southern hemisphere, said blank being fan folded at a series of spaced folds disposed transversely across the blank and in alignment with the maps to divide each map transversely into two equal sections, said blank also being fan folded longitudinally and in alignment with the maps to divide each map longitudinally into two equal sections, means for joining the transverse fan folded sections at the upper edge of the blank, and a folding case for enclosing the fan folded blank and having a series of separate pivotal hangers interengageable with alternate transverse folds to support the folded blank in upright position for display of the maps and to permit the successive pivoting of the fan folded sections about the alternate transverse folds.

6. A folding representation of a map globe comprising: a large blank having an upper series of geographically adjacent maps disposed on equally spaced areas lengthwise along the blank and together presenting the upper hemisphere of a globe, and a lower series of geographically relataed maps on equally spaced areas lengthwise along the blank and each aligned below a different map of the upper series to which it is geographically adjacent, a fold line lengthwise along the blank and dividing the upper and lower series, second and third fold lines lengthwise along the blank and respectively horizontally bisecting the upper series and the lower series of maps, a plurality of lateral fold lines equally spaced along the length of the blank and separating each of the maps from one another in both the upper and lower series and bisecting all of the maps laterally, said blank being slitted along a portion of alternative ones of the lateral fold lines from the second to the third horizontal fold line, and said blank being fan folded about both said longitudinal and lateral fold lines, thereby to selectively permit successively viewing of each adjoining one of said maps of the upper series in sequence, successive viewing of each adjoining one of the maps of the lower series in sequence, and successive referral from and to a map of the lower series from a geographically adjacent map of the upper series.

7. A folding representation of a global map comprising: a series of pages pivotally interconnected about a lateral axis, each pair of pages having two geographically related maps that are pivotally interconnected about a longitudinal axis, a folding case for supporting and displaying said maps, said case having support means for detachably engaging each of said pages, and said case having disengageable stop means for restraining both the pivotal displacement of the pages about the lateral axis and the pivotal displacement of the pair of maps on each pair of pages about the longitudinal axis, thereby to present any one of the maps on any one of the pairs of pages.

8. A system of interconnected maps arranged for successive display by selective pivoting about either the east-west or north-south axis comprising: a folding case for accommodating and supporting the maps, said case having means for supportably engaging the maps for successive pivoting about the north-south axis, and means for detachably supporting the maps in a selected pivoted position about the east-west axis, each of the maps being foldable about both north-south and east-west axes for storage, and said folding case being pivotal about the north-south axis to enclose the complete system of maps when folded about said north-south axis.

9. In a system of interconnected maps, an elongated rectangular blank divided into a series of equal square shaped areas disposed longitudinally along the blank and laterally across the blank, a separate map disposed in each of said areas with the maps both laterally and longitudinally adjacent being geographically related to one another, a series of spaced lateral fold lines separating the maps from one another and bisecting each map, a series of spaced longitudinal fold lines separating the maps from one another and bisecting each map, alternate ones of said lateral fold lines being scored from a distance extending from the uppermost lateral fold line to the lowermost lateral fold line, each of said maps containing a spherical projection of the mapped region and circumscribed by a circle, with the region outside of the circle within each square shaped area being visually distinguishable from the mapped area within, thereby to provide the illusion of viewing a global map.

10. In the system of maps of claim 9, said blank being fan folded along said longitudinal fold lines and fan folded along said lateral fold lines, thereby to enable consecutive viewing of each geographically related map by selectively pivoting the folds about the lateral and longitudinal axis.

11. In the system of claim 10, each of said maps containing a quadrant of the earth's surface in spherical projection defined by two intersecting lines of longitude and the equator and being disposed within said circle and consequently presenting to the viewer the same areas of the earth as can be viewed from a globe corresponding to the spherical projection.

References Cited by the Examiner

UNITED STATES PATENTS

| | | | |
|---|---|---|---|
| 409,160 | 8/1889 | Bacon | 40—72 |
| 413,958 | 10/1889 | O'Brien | 40—103 |
| 1,531,065 | 3/1925 | Boyer | 283—34 |
| 1,599,888 | 9/1926 | Haskell | 40—102 |
| 2,196,557 | 4/1940 | Hannicut | 40—102 |
| 2,333,162 | 11/1943 | Eddy | 35—46 |
| 2,549,306 | 4/1951 | Greene | 40—102 |
| 3,107,448 | 10/1963 | Whitney | 40—102 |

FOREIGN PATENTS

| | | |
|---|---|---|
| 832,211 | 2/1952 | Germany. |
| 619,023 | 3/1949 | Great Britain. |

EUGENE R. CAPOZIO, *Primary Examiner.*

JEROME SCHNALL, *Examiner.*

HARLAND S. SKOGQUIST, *Assistant Examiner.*